United States Patent [19]
Klappenbach et al.

[11] Patent Number: 5,731,878
[45] Date of Patent: Mar. 24, 1998

[54] MEASURING APPARATUS WITH TRANSMITTER AND RECEIVER OPTICALLY COUPLED WITH WINDSHIELD SURFACE

[75] Inventors: Christoph Klappenbach, Buehl; Manfred Burkart, Iffezheim, both of Germany

[73] Assignee: Robert Bosch GmbH, Stuttgart, Germany

[21] Appl. No.: 628,739

[22] PCT Filed: May 30, 1995

[86] PCT No.: PCT/DE95/00699

§ 371 Date: Apr. 8, 1996

§ 102(e) Date: Apr. 8, 1996

[87] PCT Pub. No.: WO96/05087

PCT Pub. Date: Feb. 22, 1996

[30] Foreign Application Priority Data

Aug. 16, 1994 [DE] Germany ............ 44 28 995.2

[51] Int. Cl.[6] .................................................. G01N 21/55
[52] U.S. Cl. ................................................................ 356/448
[58] Field of Search .................................. 359/507, 512; 356/445, 448; 318/DIG. 2

[56] References Cited

U.S. PATENT DOCUMENTS 5,543,923   8/1996   Levers et al. ...................... 356/445

FOREIGN PATENT DOCUMENTS

4343474A1   7/1994   Germany.

*Primary Examiner*—Frank G. Font
*Assistant Examiner*—Amanda Merlino
*Attorney, Agent, or Firm*—Michael J. Striker

[57] ABSTRACT

The invention is directed to a measuring apparatus with a transmitter and a receiver which is arranged at a distance therefrom. Both the transmitter and receiver are optically coupled with a surface of the windshield of a motor vehicle in the region of the wiping area covered by a wiping mechanism, the region between the transmitter and the receiver forming a measurement path for a light beam which is transmitted into the windshield by the transmitter at the angle of total reflection and which is received by the receiver and fed to an evaluating device. The transmitter and the receiver are accommodated in a housing supported at the inner side of the windshield and are supported therein via a preferably shared supporting member. A measuring apparatus operating in a particularly dependable manner is achieved in that a heatable component whose plate-shaped portion is disposed directly opposite the measurement path is arranged in the housing which is at least partially open to the windshield, this component being formed of a material with good heat conducting properties and supported at the housing.

10 Claims, 3 Drawing Sheets

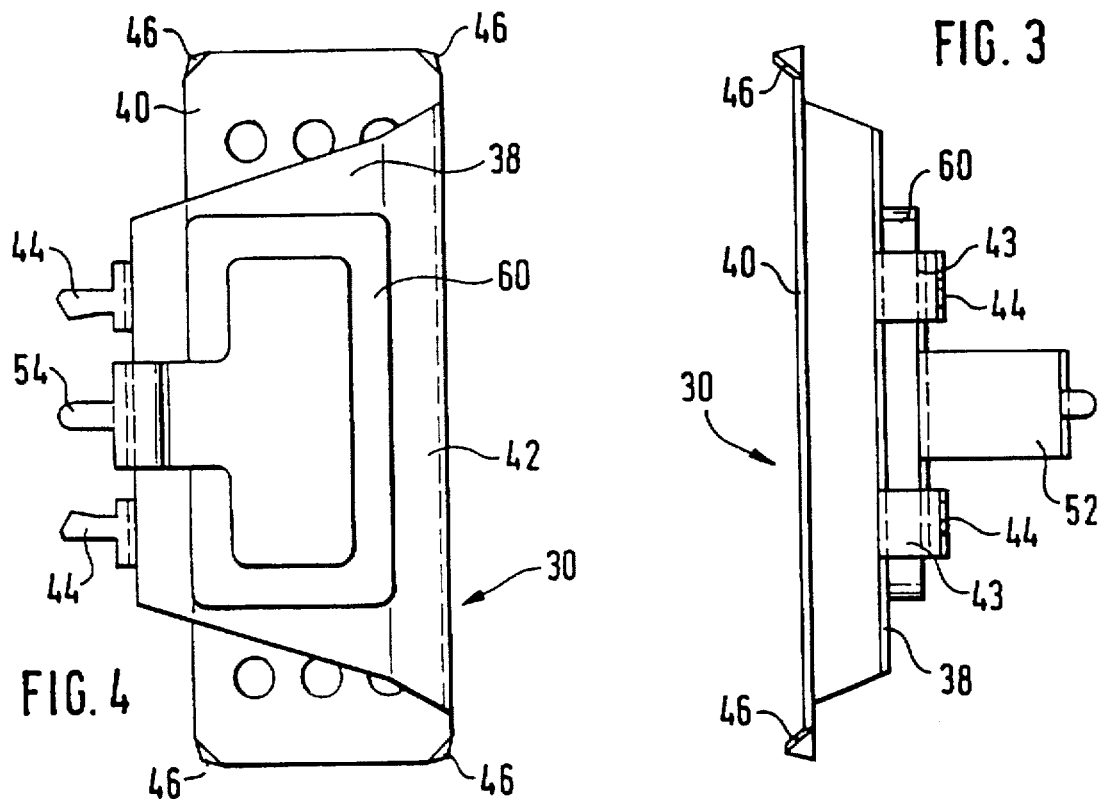
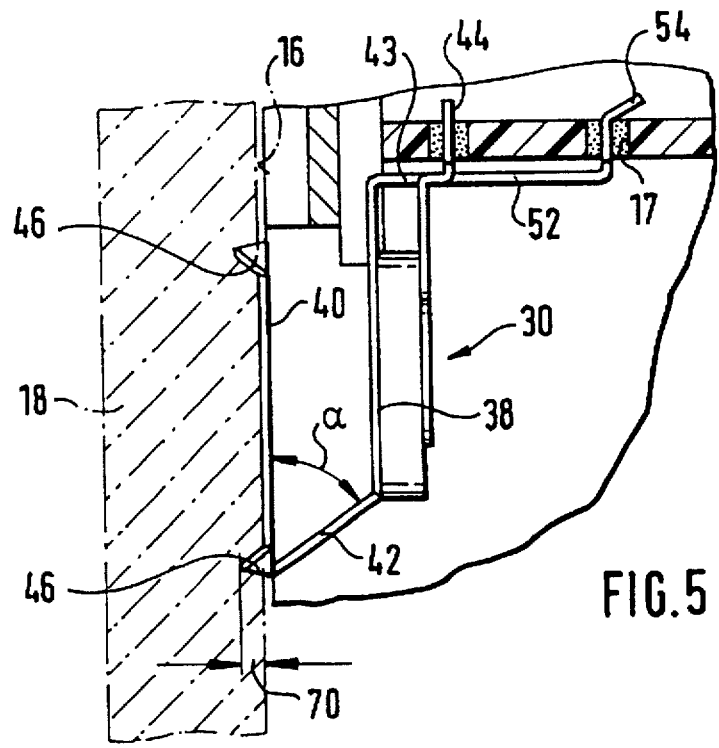

MEASURING APPARATUS WITH TRANSMITTER AND RECEIVER OPTICALLY COUPLED WITH WINDSHIELD SURFACE

BACKGROUND OF THE INVENTION

The present invention relates to a measuring apparatus.

In particular, it relates to a measuring apparatus with a transmitter and a receiver which is arranged at a distance therefrom, being optically coupled with a surface of the windshield of a motor vehicle.

Measuring devices of the type indicated measure the quantity of light reaching a receiver and compare it with the quantity of light transmitted by the transmitter in the windshield. If the resulting difference falls below a given value, the windshield wiper mechanism of the motor vehicle is activated via the evaluating device since it is assumed in this case that the loss of light in the measurement path is due to rain, snow or other soiling. In known commercially available measuring devices of the generic type, erroneous measurement and accordingly unwarranted activation of the windshield mechanism can be brought about, for instance, by condensation forming on the inside of the windshield, since the measuring device is always placed outside of the field of view of the driver, that is, in the region of the inside rearview mirror. Since the formation of condensation in that location cannot be reliably prevented by the hot-air blower, unwanted, troublesome and uncalled-for operation of the wiper system will keep occurring.

SUMMARY OF THE INVENTION

Accordingly, it is an object of the present invention to provide a measuring apparatus of the above mentioned type, which avoids the disadvantages of the prior art.

In keeping with these objects and with others which will become apparent hereinafter, one feature of the present invention resides, briefly stated, in a measuring apparatus having a housing which is at least partially opened toward the windshield, and a heatable component composed of a material with good heat conducting properties and which is located opposite to a plate-shaped portion of a measurement path is supported at the housing.

The measuring apparatus according to the invention has the advantage over the prior art that the heatable component element always ensures that the measurement path will be free of condensation so that unnecessary operation of the wiper mechanism is prevented in a dependable manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

An embodiment example of the invention is shown in the drawings and is explained

FIG. 3 shows the component element according to FIG. 2 in a side view;

FIG. 4 shows a top view of the component element according to FIGS. 2 and 3;

FIG. 5 shows a partial region of the arrangement according to FIG. 1 without the windshield.

DESCRIPTION OF PREFERRED EMBODIMENTS

Figure 1:
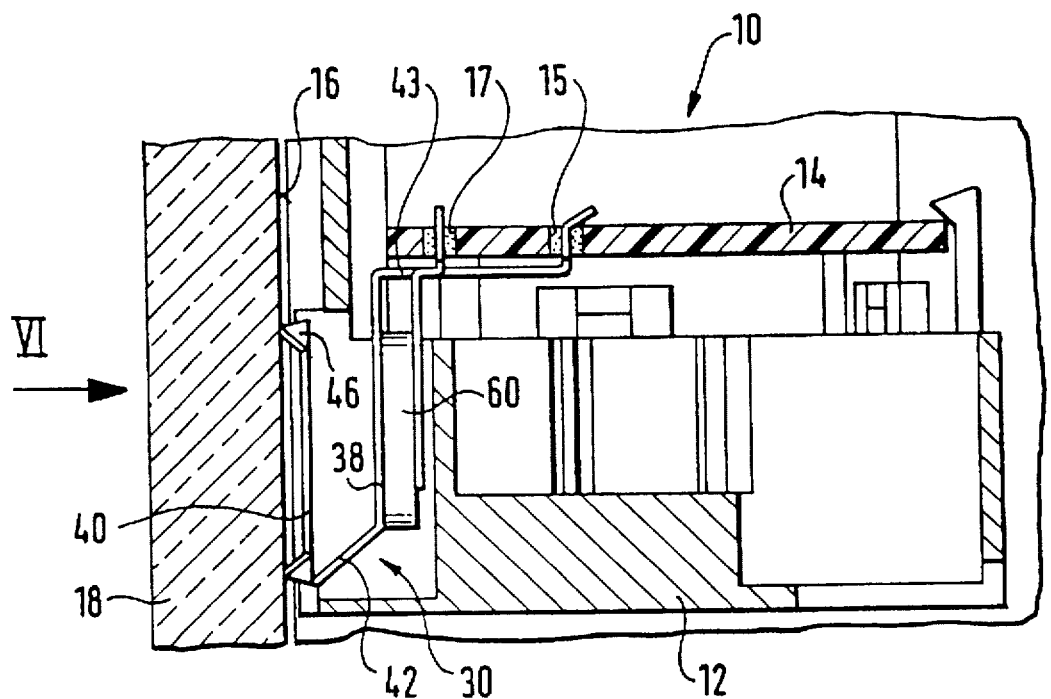
FIG. 1 is an enlarged view showing a section through a measuring apparatus according to the invention and a partial region of the windshield of a motor vehicle along line I—I in FIG. 6.
Figure 2:
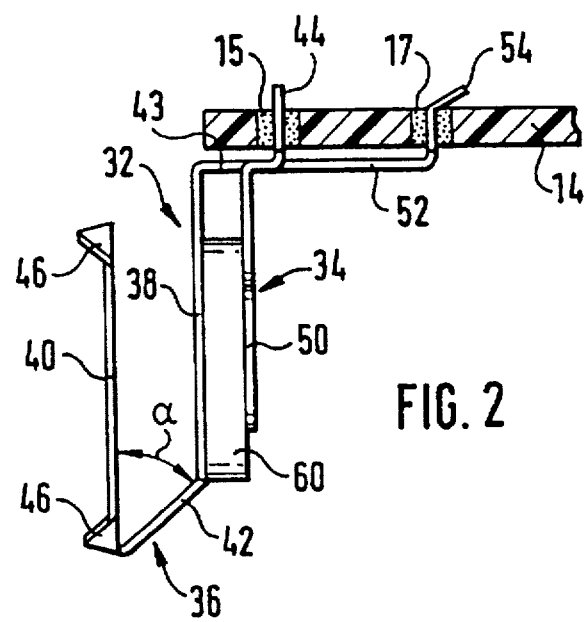
FIG. 2 is a sectional view showing a component element of the measuring apparatus which is provided with a heating element and a partial region of a supporting member supporting the component element according to FIG. 1.
Figure 6:
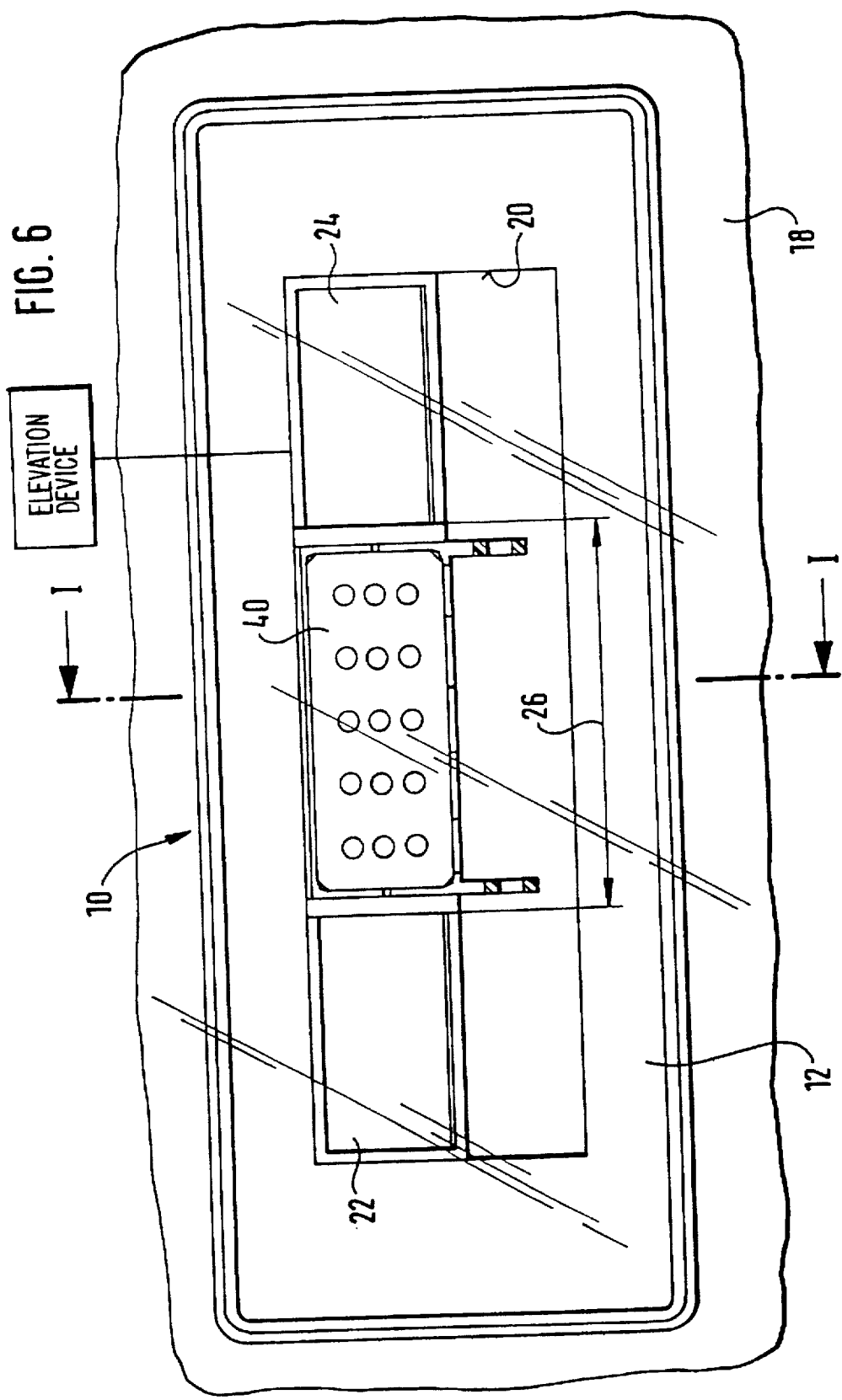
FIG. 6 shows a view of the arrangement according to FIG. 1 in the direction of arrow VI.

A measuring apparatus 10 shown in FIG. 1 has a housing which is partially shown in FIG. 1 and is designated by reference number 12. The measuring apparatus 10 has a supporting member which is constructed as a printed circuit board 14 and is fastened in the housing 12 in a secure but detachable manner. The measuring apparatus 10 is attached to the inside 16 of the windshield 18 of a motor vehicle, not shown in more detail (FIGS. 1 and 6). The side of the housing 12 facing the windshield 18 is partially open. Thus, it has an opening 20 which permits a view of the elements of the measuring apparatus 10 which are essential to its operation. The measuring apparatus has a transmitter 22 and a receiver 24 which are arranged at a distance 26 from one another (FIG. 6). The distance 26 represents an interval forming a measurement path for light beams which are coupled into the windshield 18 by the transmitter 22, the intensity of the light beams being measured by the receiver 24. For this purpose, the light beams are transmitted into the windshield 18 by the transmitter 22 at the angle of total reflection. The receiver 24 measures the intensity of the light beams striking it and feeds the results of its measurement to an evaluating device, not shown. For this purpose, both the transmitter 22 and the receiver 24 of the measuring apparatus 10 are optically coupled with the inner surface 16 of the windshield 18. The arrangement of the measuring apparatus 10 on the inner side of the windshield 18 is effected in such a way that this measuring apparatus 10 is located within a wiping region covered by the motor vehicle's wiping mechanism, not shown in the drawing. The measuring apparatus 10 is normally located in the vicinity of the upper edge of the windshield 18 in the central region of the windshield 18, where the rearview mirror is also arranged, in order to minimize obstruction of the view of the driver of the motor vehicle. The measuring apparatus 10 also has a component 30 whose construction is shown in particular in FIGS. 2 to 4. The component 30 is constructed in two parts. It has a support part 32 and a contact part 34. The support part 32 has a base body 36 which is substantially U-shaped in cross section, the two legs 38 and 40 of the U shape being arranged substantially parallel to one another. One U-leg 40 is constructed as a plate-shaped portion. A strip-shaped part 42 forming the cross piece or base of the U shape adjoins one longitudinal edge of the plate-shaped part 40 and passes into the other U-leg 38. The free end of the U-leg 38 passes into a support angle 43 having two connection tabs 44 which are bent at right angles. The plate-shaped U-leg 40 is provided, in its corner region, with beveled support legs 46 which extend toward the side remote of the U-leg 38. As will be seen particularly from FIGS. 1, 2 and 5, the sides of the plate-shaped U-leg 40 facing the interior of the U and the strip-shaped U-base 42 enclose an acute angle α. The connection tabs 44 penetrate the printed circuit board 14 through bore holes 15 in which they are glued or cast so as to provide a proper seating of the support part 32 at the printed circuit board 14. The contact part 34 has a contact plate 50 which passes into a support arm 52 which is angled relative to the latter and which is provided, at its end remote of the contact plate 50, with a connection lug 54 which is bent approximately at right angles thereto. The connection lug 54 likewise penetrates the printed circuit board 14 through a bore hole 17 and is held therein so as to be fixed in place in the same way as the connection tabs 44. The two parts 32 and 34 of the component 30 are arranged relative to one another in such a way that the U-leg 38 of the support part 32 and the contact plate 50 of the contact part 34 extend parallel to one another and at a distance from one another. The distance between the contact plate 50 and the U-leg 38 is adapted to the thickness of a heating element 60 which is arranged at the outer side of the U-leg 38 of the support part 32 facing the contact plate 50 so as to impair neither the electrical contact between the support part 32 and the heating element 16 nor the heat transfer from the heating element 60 to the support part 32. The arrangement of the contact part 34 in the embodiment example is effected in such a way that the contact plate 50 contacts the side of the block-shaped heating element 60 facing it so as to be somewhat pretensioned. The two parts 32 and 34 of the component 30 are produced from electrically conducting material which also has good heat conducting properties. For this purpose, $CuSn_6F_{48}$ has proven particularly favorable. The connection tabs 44 and the connection lug 54 serve to connect the conductor of a heating circuit which is not shown in more detail. When activated, the heating element 60 heats up and conveys its heat, particularly via the strip-shaped U-base 42, to the U-leg 40 of the support part 32, which U-leg 40 serves as a heating plate.

When the measuring apparatus 10, as such, is preassembled, but not yet arranged at the windshield 10, the U-leg 40 of the supporting part 32 projects out of the opening 20 of the housing 12 by a distance 70, shown in FIG. 5. However, attaching the measuring apparatus 10 to the inner side 16 of the windshield 18 results in the assembly shown in FIG. 1 in which the support part 32 is supported at the inner side 16 of the windshield 18 so as to be pretensioned by its support legs 46. This is possible because the component 30, and the support part 32 in particular, are formed of the material mentioned above which, aside from good heat conducting properties and sufficient toughness, also has favorable suspension characteristics. By arranging the U-base 42 at an acute angle α relative to the U-leg 40 it is ensured that the support part 32 retains its desired assembly position substantially parallel to the inner side 16 of the windshield 18 with pretensioning relative to the windshield 18. The projection-like support legs 46 ensure the prescribed distance between the inner side 16 of the windshield 18 and the outer side of the U-leg 40 which is located directly opposite the windshield 18 and faces the latter, so that a reliable evaporation of the condensation which may possibly collect in the region of the measurement path 26 is ensured.

The special construction of the component 30 and support part 32 results in a suspension which, after the measuring apparatus 10 is mounted at the windshield 18, provides for pretensioning by means of which the leg 40 serving as a heating plate contacts the inner side of the windshield 18 by its support legs 44. Clearly, the support part 32 and the contact part 34 must be electrically isolated from one another in order to prevent electrical problems. This is ensured by the special two-part design of the component 30 which is shown in particular in FIGS. 2 to 4.

We claim:

1. A measuring apparatus, comprising a transmitter and a receiver arranged at a distance from one another and optically coupled with a surface of a motor vehicle windshield in a region of a wiping area covered by a wiping mechanism so that a region between said transmitter and said receiver forms a measurement path for a light beam which is transmitted into the windshield by said transmitter at an angle of total reflection and which is received by said receiver; an evaluating device to which a signal received by said receiver is fed; a housing accommodating said transmitter and said receiver and supportable at an inner side of the windshield, said housing being at least partially open to the windshield; a heatable component arranged in said housing and having a plate-shaped portion disposable directly opposite to the windshield to provide evaporation of a condensation collected in the region of said measurement path, said component being formed of a heat conducting material and supported at said housing; a supporting member which supports said transmitter and said receiver in said housing; and means which biases said plate-shaped portion of said component to the windshield, said means including a strip which is encloses an acute angle with a surface of said plate-shaped portion.

2. A measuring apparatus as defined in claim 1; and further comprising projections which are connected with said plate-shaped portion of said component and support said plate-shaped component on the windshield.

3. A measuring apparatus as defined in claim 1, wherein said heatable component is composed of an elastic material.

4. A measuring apparatus as defined in claim 1, wherein said heatable component has a support part and a contact part which are electrically insulated from one another.

5. A measuring apparatus as defined in claim 1, wherein said heatable component has a supporting part which is composed $CuSn_6F_{48}$.

6. A measuring apparatus as defined in claim 1; and further comprising a supporting plate arranged at a distance from said plate-shaped portion of said heatable component and parallel to said plate-shaped portion, said strip which is connected with one longitudinal side of said plate-shaped portion merging into said supporting plate.

7. A measuring apparatus, comprising a transmitter and a receiver arranged at a distance from one another and optically coupled with a surface of a motor vehicle windshield in a region of a wiping area covered by a wiping mechanism so that a region between said transmitter and said receiver forms a measurement path for a light beam which is transmitted into the windshield by said transmitter at an angle of total reflection and which is received by said receiver; an evaluating device to which a signal received by said receiver is fed; a housing accommodating said transmitter and said receiver and supportable at an inner side of the windshield, said housing being at least partially open to the windshield; a heatable component arranged in said housing and having a plate-shaped portion disposable directly opposite to the windshield to provide evaporation of a condensation collected in the region of said measurement path, said component being formed of a heat conducting material and supported at said housing; projections which are connected with said plate-shaped portion of said component and support said plate-shaped portion on the windshield; a supporting member which supports said transmitter and said receiver in said housing; and means which biases said plate-shaped portion of said component to the windshield, said means including a strip which is encloses an acute angle with a surface of said plate-shaped portion.

8. A measuring apparatus, comprising a transmitter and a receiver arranged at a distance from one another and optically coupled with a surface of a motor vehicle windshield in a region of a wiping area covered by a wiping mechanism so that a region between said transmitter and said receiver forms a measurement path for a light beam which is transmitted into the windshield by said transmitter at an angle of total reflection and which is received by said receiver; an evaluating device to which a signal received by said receiver is fed; a housing accommodating said transmitter and said receiver and supportable at an inner side of the windshield, said housing being at least partially open to the windshield; a heatable component arranged in said housing and having a plate-shaped portion disposable directly opposite to the windshield to provide evaporation of a condensation collected in the region of said measurement path, said component being formed of a heat conducting material and supported at said housing; a supporting member which supports said transmitter and said receiver in said housing; means which biases said plate-shaped portion of said component to the windshield, said means including a strip which encloses an acute angle with a surface of said plate-shaped portion; and a heating element which is arranged on a side of said supporting plate remote from said plate-shaped portion.

9. A measuring apparatus as defined in claim 8, wherein said heatable component has a contact element which is composed of an electrically conducting material and supported at said heating element at a side of said heating element remote from said supporting plate, said contact element having a third connection tab which penetrates said supporting member and being secured in said supporting member.

10. A measuring apparatus, comprising a transmitter and a receiver arranged at a distance from one another and optically coupled with a surface of a motor vehicle windshield in a region of a wiping area covered by a wiping mechanism so that a region between said transmitter and said receiver forms a measurement path for a light beam which is transmitted into the windshield by said transmitter at an angle of total reflection and which is received by said receiver; an evaluating device to which a signal received by said receiver is fed; a housing accommodating said transmitter and said receiver and supportable at an inner side of the windshield, said housing being at least partially open to the windshield; a heatable component arranged in said housing and having a plate-shaped portion disposable directly opposite to the windshield to provide evaporation of a condensation collected in the region of said measurement path, said component being formed of a heat conducting material and supported at said housing; a supporting member which supports said transmitter and said receiver in said housing, said heatable component having two connection tabs which are connected with said supporting plate, said connection tabs penetrating said supporting member and being secured to said supporting member.

* * * * *